United States Patent [19]

Katagiri et al.

[11] Patent Number: 4,595,059

[45] Date of Patent: Jun. 17, 1986

[54] METHOD OF PROVIDING A CONDUCTOR PIPE TO AN OPENING PORTION OF A WELL

[75] Inventors: Kunio Katagiri, Funabashi; Joji Arimura, Yokosuka; Kazuo Kondo, Chigasaki; Taisuke Fujise, Tokyo, all of Japan

[73] Assignees: Japan Metals & Chemicals Co., Ltd.; Shimizu Construction Co., Ltd., both of Japan

[21] Appl. No.: 661,152

[22] Filed: Oct. 15, 1984

[30] Foreign Application Priority Data

Oct. 18, 1983 [JP] Japan ................. 58-194765

[51] Int. Cl.⁴ .................. E21B 7/20; E21B 33/14
[52] U.S. Cl. .................. 166/290; 175/171; 175/202; 175/323
[58] Field of Search ........... 166/285, 287, 290; 175/171, 202, 257, 303, 323, 325

[56] References Cited

U.S. PATENT DOCUMENTS

| | | | |
|---|---|---|---|
| 2,303,178 | 11/1942 | Schweitzer | 175/325 X |
| 3,565,190 | 2/1971 | Ishii | 175/171 |
| 3,604,214 | 9/1971 | Turzillo | 175/323 X |
| 3,833,071 | 9/1974 | Koosman et al. | 175/323 X |
| 4,133,397 | 1/1979 | Tschirky | 175/325 X |
| 4,148,367 | 4/1979 | Reich | 175/171 |

Primary Examiner—George A. Suchfield
Attorney, Agent, or Firm—Kane, Dalsimer, Kane, Sullivan and Kurucz

[57] ABSTRACT

A method of providing a conductor pipe to an opening portion of a well such as an oil well, gas well, geothermal power well or the like. A bore is formed in the ground with a casing tube and an auger screw, inserted into the casing tube, to a predetermined depth, after which the auger screw is withdrawn from the casing tube. Then, the conductor pipe is inserted and concentrically positioned in the casing tube, placed in the bore, to form an annular space between them, to which space a solidifiable filler is supplied from the bottom portion of the space to the upper portion thereof. The casing tube is thereafter withdrawn from the bore and then the filler is solidified to thereby fix the conductor pipe to the opening portion of the well.

5 Claims, 15 Drawing Figures

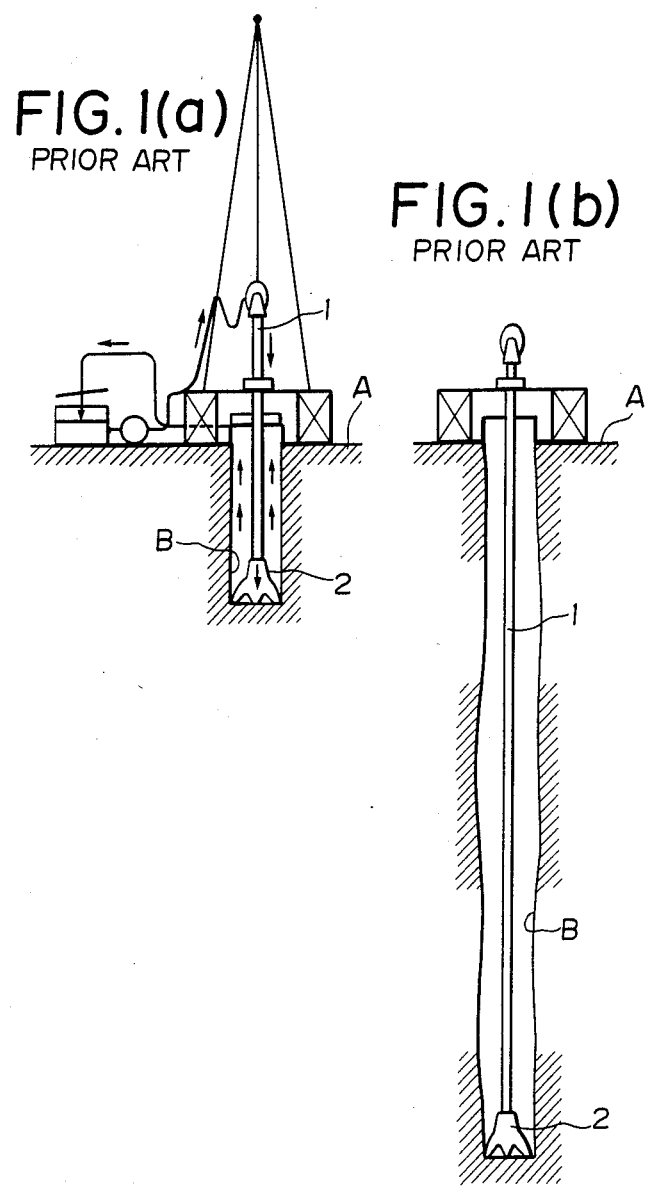

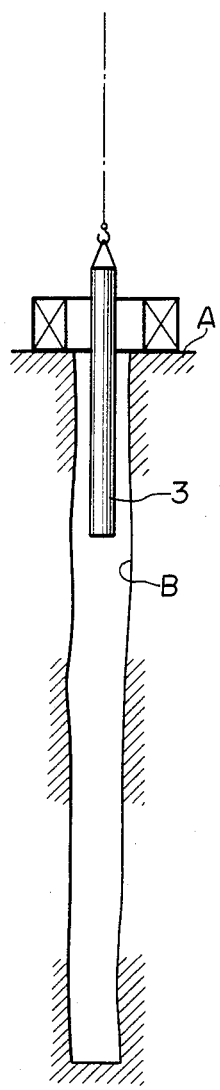
FIG.I(c) PRIOR ART
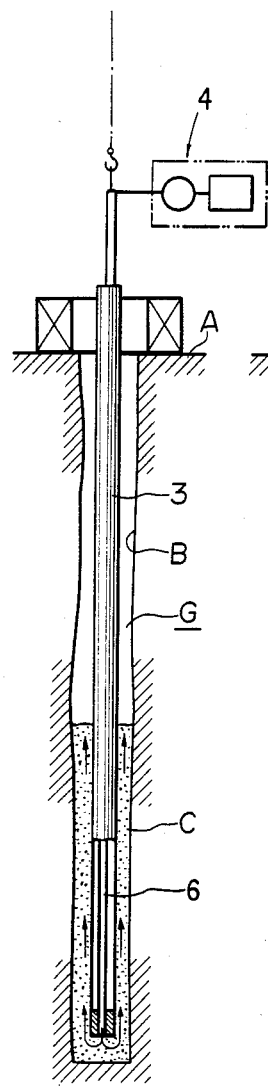
FIG.I(d) PRIOR ART
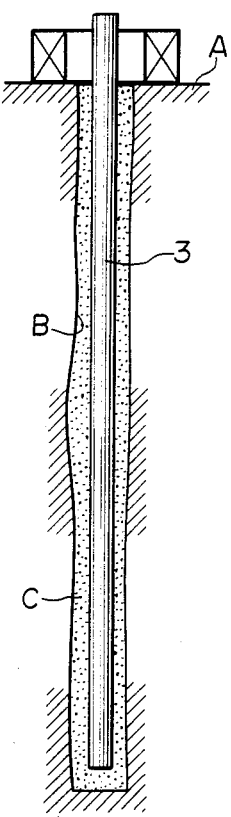
FIG.I(e) PRIOR ART

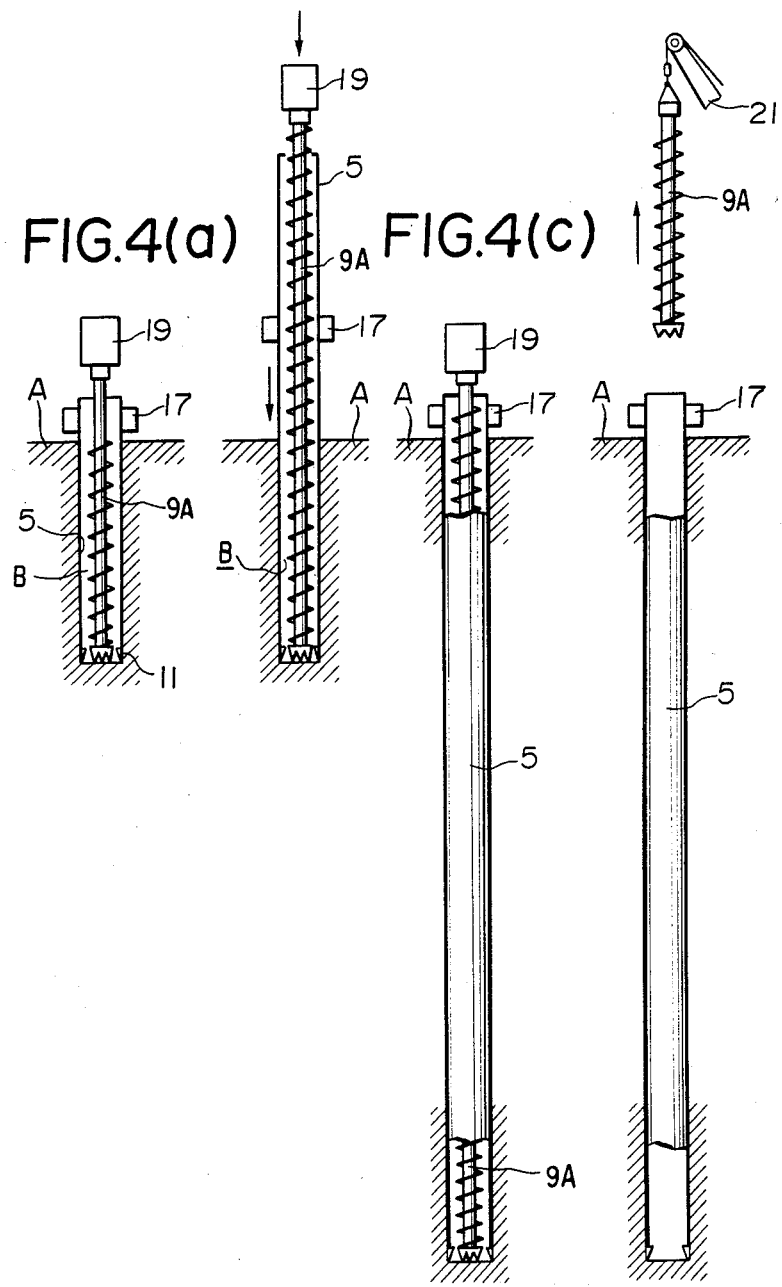

METHOD OF PROVIDING A CONDUCTOR PIPE TO AN OPENING PORTION OF A WELL

BACKGROUND OF THE INVENTION

The present invention relates to a method of providing a conductor pipe to an opening portion of a well such as an oil well, gas well, geothermal power well or the like.

Conventionally, such wells have been bored by means of the rotary drilling machine (hereinafter referred to as drilling rig) to a depth of several kilometers.

FIGS. 1(a) to (f) illustrates initial stages of a typical example of the conventional method for drilling a geothermal well by means of the drilling rig, in which an opening portion of the well is formed. In this drilling method, firstly the ground A is, as shown in FIG. 1(a), drilled by rotating a drilling pipe 1 and a bit 2 attached at the lower end of the drilling pipe 1 while a mud is forcedly circulated through the drilling pipe 1 and the bit 2 to thereby transport the cutting to the outside of a well B. As the drilling proceeds further, the drilling pipe 1 is coaxially connected to subsequent pipes. The well B is thus formed to a predetermined depth as shown in FIG. 1(b). Then, a conductor pipe 3 is inserted into the well B (FIG. 1(c)) after the drilling pipe 1 and the bit 2 are withdrawn from the well B. Thereafter, an injection pipe 5 is inserted into the conductor pipe 3 placed in position and a solidifiable filler such as a cementinuous slurry C is then pumped from a filler pumping unit 4 through the injection pipe 6 to fill the annular space between the conductor pipe 3 and the wall of the well B as shown in FIG. 1(d). Finally, the conductor pipe 3 is, as illustrated in FIG. 1(e), fixed in the opening portion of the well B by the setting of the filler C to thereby complete the forming of the opening portion of the well. The well B is drilled to a predetermined depth by repeating the above-described method with the bits and the conductor pipes of smaller diameters.

This prior art drilling method has the following problems in forming the opening portion of the well B. The depth of the opening portion of the well is generally 30 to 50 meters and hence this prior art method can be poor in drilling efficiency since the drilling pipe 1 and the bit 2 may not provide by their weight a bit load sufficient for drilling the well. The opening portion of the well B is formed in the surface portion of the ground, the surface portion containing various layers such as a silt layer, cobblestone layer, bounding stone layer and rock bed. Particularly, the bit 2 is, according to the prior art, repelled by the cobblestone layer and the bounding stone layer during the drilling, so that the drilling perpendicularity of the well B is degraded and the diameter thereof becomes larger than the design diameter. These cause the consumption of the filler C larger than the design amount thereof. For example, for about 40 m deep opening portion of a typical geothermal power well constructed according to this prior art method, the maximum drilling perpendicularity is about 1/100 and the filler loss ratio is about 20%. Further, this method has disadvantages in that the mud, circulating in the well B during drilling, escapes into clearances, communicating to the well, between adjacent layers to thereby weaken the supporting ground of the drilling rig and wash out the wall of the well.

SUMMARY OF THE INVENTION

Accordingly, it is an object of the present invention to provide a method of providing a conductor pipe to an opening portion of a well, in which time and cost for the construction of the opening portion of the well is reduced.

It is another object of the present invention to provide a method of providing a conductor pipe to an opening portion of a well in which drilling efficiency is enhanced.

It is a further object of the present invention to provide a method of providing a conductor pipe to an opening portion of a well in which an excess from the design diameter and an inclination of the well are largely reduced.

It is a still further object of the present invention to provide a method of providing a conductor pipe to an opening portion of a well, in which the weakening of the ground around the opening portion of the well is prevented.

It is a further object of the present invention to provide a method of providing a conductor pipe to an opening portion of a well, in which the opening portion of the well may be drilled much more deeply than in the prior art drilling method.

With these and other objects in view the present invention provide a method of providing a conductor pipe to an opening portion of a well such as an oil well, gas well, geothermal power well or the like. A bore is formed in the ground with a casing tube and an auger screw, inserted into the casing tube, to a predetermined depth, after which the auger screw is withdrawn from the casing tube. Then, the conductor pipe is inserted and concentrically positioned in the casing tube, placed in the bore, to form an annular space between them, to which space a solidifiable filler is supplied from the bottom portion of the space to the upper portion thereof. The casing tube is thereafter withdrawn from the bore and then the filler is solidified to thereby fix the conductor pipe to the opening portion of the well.

BRIEF DESCRIPTION OF THE DRAWINGS

FIGS. 1(a) to 1(e) illustrate the process of forming the opening portion of a geothermal power well according to a typical example of the prior art;

FIGS. 4(a) to 4(h) illustrate the process of forming the opening portion of another geothermal power well according to the present invention.

DETAILED DESCRIPTION OF THE PREFERRED EMBODIMENT

Figure 2:
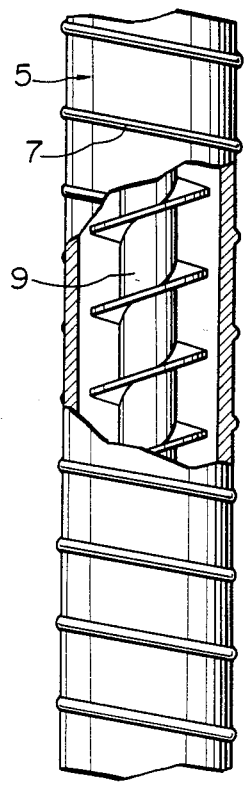
FIG. 2 is an enlarged fragmentary view, partly cut away, of a casing tube and an auger screw fitted in it, the casing tube and the auger screw being used in practicing the present invention.
Figure 3:
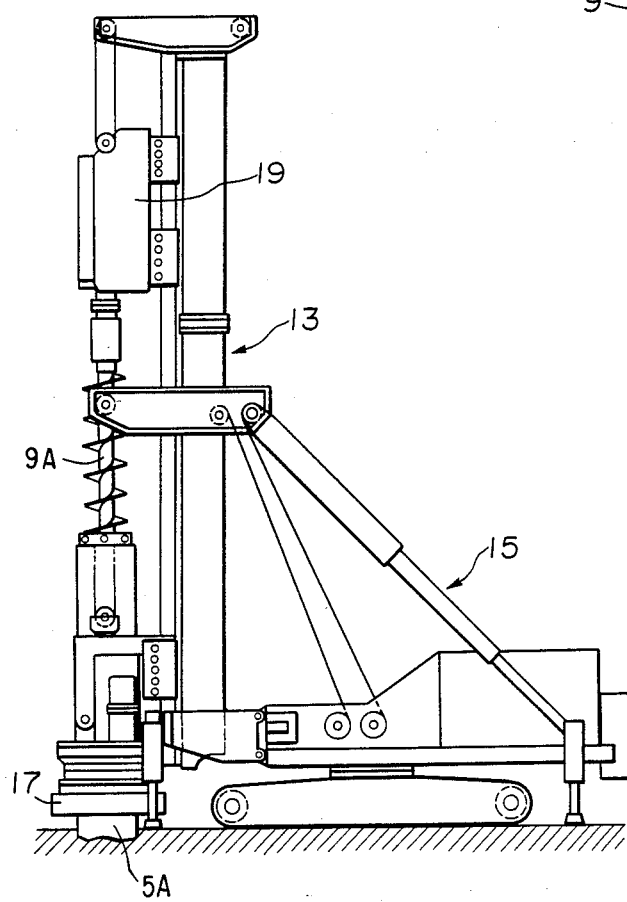
FIG. 3 is a side view of a drilling machine used in the present invention.

Referring to FIGS. 2 to 4, one embodiment of the present invention, in which a geothermal power plant well is drilled, will be described. In this embodiment, use is made of casing tube pieces 5A each having a round steel 7 spirally welded on the outer face thereof and auger screw pieces 9A to be inserted into the casing tube pieces 5A. The bottom casing tube piece 5A is provided at its distal end with a cutting edge 11 (FIG. 4(a)).

The bottom casing tube piece 5A and the bottom auger screw piece 9A are, as shown in FIG. 3, vertically attached to a leader mast 13 of a crawler mounted drilling machine 15. The bottom casing tube piece 5A is held at its proximal end by an outer drilling device 17 which is vertically movably supported by the leader mast 13. The bottom auger screw piece 9A is attached at its proximal end to an inner drilling device 19 which is supported by the leader mast 13 to be vertically movable and pivotable about a vertical axis. Then, the casing tube piece 5A is rotated by the outer drilling device 17 to bore into the ground A and at the same time the auger screw piece 9A is rotated in the reverse direction by the inner drilling device 19 to screw into the ground A. Thus, the drilling is, as shown in FIG. 4(a), carried out to a depth substantially equal to the length of the bottom casing tube piece 5A. In this drilling operation, a sufficient drilling force is exerted by the auger screw piece 9A since it screws into the ground A. While the casing tube piece 5A is pushed into the ground A, the round steel 7 provided around it makes the wall of the drilled well C more compact to thereby prevent the crumbling of the wall and lessens the frictional drag of the casing tube piece 5A with respect to the well wall.

Then, another casing tube piece 5A and auger screw piece 9A are, as shown in FIG. 4(b), coaxially jointed to the preceding casing tube piece 5A and auger screw piece 9A, respectively, in a conventional manner and thereafter the well is again drilled in the same manner. These procedures are repeated until a predetermined depth of well B is, as shown in FIG. 4(C), bored by a casing tube 5 and auger screw 9 thus formed.

The cuttings produced in the above drilling is transported upwards within the casing tube 5 by the jointed auger screw 9 and then continuously discharged from the upper opening of the jointed casing tube 5 to the ground surface.

Figure 4E:
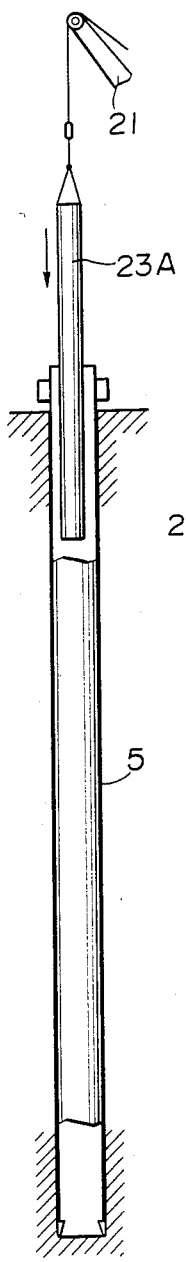

After the drilling of the well B is completed, the auger screw 9 placed in the well is, as illustrated in FIG. 4(d), withdrawn from there by a subcrane 21 in a conventional manner. Thereafter, a bottom conductor pipe piece 23A is, as shown in FIG. 4(e), inserted into the casing tube 5 by the subcrane 21. A subsequent conductor pipe piece 23A is concentrically jointed to the preceding conductor pipe piece 23A, already placed within the well B, in a conventional manner before it is inserted into the well B, and then the thus jointed conductor pipe pieces 23A are lowered into the casing tube 5. These procedures are repeated until the conductor pipe 23 thus formed concentrically extends over the overall length of the casing tube 5. The bottom end of the conductor pipe 23 may be closed or blinded by a concrete for preventing a filler, which is used in the subsequent step, for entering it. A weight is inserted into the conductor pipe 23 for preventing the latter from being raised by buoyancy when the filler is charged into the annular space between the casing tube 5 and the conductor pipe 23. Further, water or the like may be poured into the conductor pipe 23 for the same purpose. Water or the like is poured also for the purpose of ultrasonic measurement as to the perpendicularity of the conductor pipe 23 thus set.

Figure 4F:
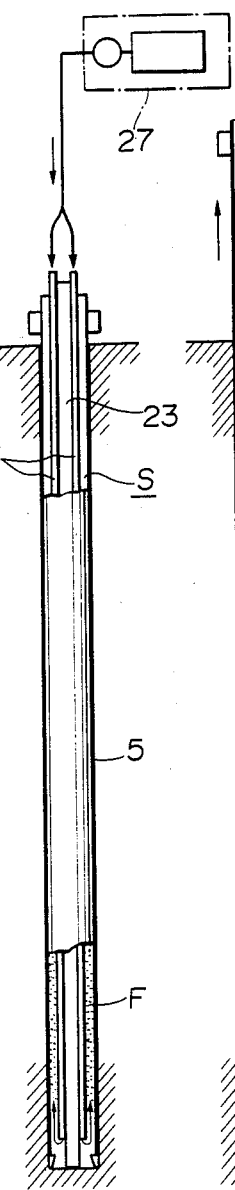

Then, a pair of filler injection pipes 25 and 25 are, as shown in FIG. 4(f), inserted into the annular space S defined between the casing tube 5 and the conductor pipe 23, and a solidifiable filler F is pumped from a filler pumping unit 27 through the filler injection pipes 25 and 25 into the bottom of the annular space S. Thus, the annular space S is filled with the filler F from the bottom to the opening portion thereof, after which the filler injection pipes 25 and 25 are removed from the annular space S. At this stage, the annular space S is charged with the filler F to a level near the ground level.

Figure 4G:
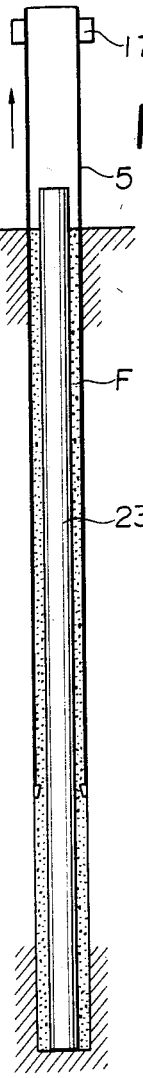
Figure 4H:
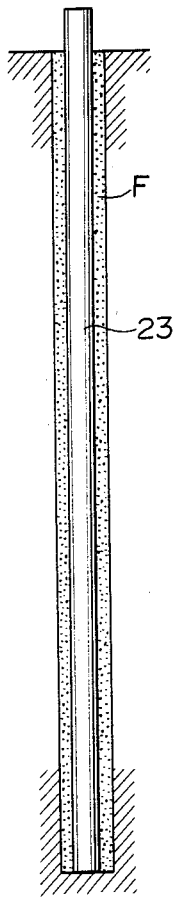

Thereafter, the casing tube 5 is, as shown in FIG. 4(g), lifted and removed by a lifting device (not shown) from the well B to thereby allow the filler F to fill by gravity the space, previously occupied by the casing tube 5, within the well B. The conductor pipe 23 is, as illustrated in FIG. 4(h), fixed to the well C by setting the filler F. As the solidifiable filler F use may be made of a cement slurry, mortar or the like.

The filler injection pipes 25 may be previously attached in a detachable manner to the conductor pipe pieces 23A and may be inserted into the well B together with the conductor pipe pieces 23A.

According to the present invention, during the drilling of a well, the casing tube consolidates the wall of the well, closes with cuttings gaps formed between adjacent layers and communicating to the well, and protects the wall of the well. Even in the surface portion of the ground, which contains various kinds of layers, the present invention thus prevents the crumbling of the well wall and largely reduces an inclination of the well and an excess from the design diameter thereof. The consolidation of the wall well and the closing of the gaps formed between adjacent layers makes the space between the well wall and the conductor pipe equal throughout the depth of the opening portion of the well and largely reduces the amount of the filler escaping into the layer gaps. Thus, the conductor pipe is fixed to the well with a substantially design amount of filler. The present invention further achieves highly efficient drilling of wells by the combination of the auger screw and the casing tube. These features enable the fixing of the conductor pipe to the well in a less costly and a less time-consuming manner.

EXAMPLE

A 35 m deep opening portion of a geothermal power well was constructed in a surface portion of the ground. The soil of the opening portion of the well consisted of a 2 m thick fill-up ground, a 2 m thick surface soil containing a humus, a 4.5 m thick loam layer underlying the surface soil and containing andesite gravel smaller than 20 cm in diameter, a 5 m thick medium-size andesite gravel layer underlying the loam layer and containing gravel 25 cm to 50 cm in diameter, a 5 m thick large-size andesite gravel layer underlying the medium-size andesite gravel layer and containing gravel larger than 50 cm in diameter, and a 16.5 m thick andesite debris. The drilling machine used was of the type illustrated in FIG. 3. The drilling diameter of the casing tube and that of the auger screw are 880 mm and 710 mm respectively.

The drilling of the opening portion of the well was carried out in the manner illustrated in FIGS. 4(a) to 4(h). The opening portion was drilled by the casing tube to a depth of 34 m and by the auger screw to a depth of 35 m. After the auger screw was, as shown in FIG. 4(e), from the well, desliming was carried out with a hammer grab. The drilled opening portion of the well had a drilling perpendicularity of 1/182 to 1/300. The conductor pipe used was a carbon steel pipe 508 mm in outer diameter and 9.5 mm in thickness and had an overall length 36.7 m. The conductor pipe consisted of concentrically welded three pieces, each having 12 m length, and a 0.7 m long blind shoe attached to the lower end of the lower most pipe piece. The conductor pipe was provided at the outer face of each opposite end thereof with four spacers for spacing the conductor pipe from the wall of the well. After two drill collars as weights were inserted into the conductor pipe placed in position within the well, water was poured into the conductor pipe for preventing the latter from being raised by buoyancy when the filler was charged into the well. As the filler use was made of a mortar. The designed injection amount and the consumption of the mortar was 13.981 m$^3$ and 15.426 m$^3$ respectively. The loss ratio was therefore 10.3%. The withdrawal of the casing tube as shown in FIG. 4(g) was carried out in six separate steps, each elevating the casing tube to a different level. For each elevating step an additional amount of the mortar was supplied to the opening portion of the well for filling the space, previously occupied by the casing tube, within the opening portion. Finally, the two drill collars were removed from the conductor pipes. The time for carrying out the drilling of the opening portion of the well was 736 minutes and the time for setting the conductor pipe to the opening portion inclusive of inserting the conductor pipe, removing the casing tube and grouting the mortar was 470 minutes.

While the invention has been disclosed in specific detail for purposes of clarity and complete disclosure, the appended claims are intended to include within their meaning all modifications and changes that come within the true scope of the invention.

What is claimed is:

1. A method of providing a conductor pipe to an opening portion of a well, comprising:
   (a) drilling the ground with a casing tube and an auger screw, inserted into the casing tube, to form a bore to a predetermined depth;
   (b) then, withdrawing the auger screw from the casing tube;
   (c) thereafter, inserting the conductor pipe into the casing tube placed in the bore and concentrically positioning the conductor pipe in the casing tube to form an annular space therebetween;
   (d) supplying a solidifiable filler to the annular space from the bottom portion of the space to the upper portion thereof;
   (e) after the step d, withdrawing the casing tube from the bore; and
   (f) after the step e, solidifying the filler to thereby fix the conductor pipe to the opening portion of the well.

2. A method of providing a conductor pipe to an opening portion of a well as recited in claim 1, before the step (d) further comprising; blinding the lower end of the conductor pipe for preventing the filler from entering the conductor pipe; and providing a weight to the conductor pipe for preventing the conductor pipe from being raised by buoyancy when the filler is supplied to the annular space between the conductor pipe and the casing tube.

3. A method of providing a conductor pipe to an opening portion of a well as recited in claim 2, wherein the step of providing the weight comprises supplying water into the conductor pipe.

4. A method of providing a conductor pipe to an opening portion of a well as recited in claim 3, during the step (e) further comprising supplying an additional solidifiable filler to fill the annular space with the solidifiable filler to the opening portion of the bore.

5. A method of providing a conductor pipe to an opening portion of a well as recited in claim 4, wherein the withdrawal of the casing tube in the step (e) is carried out in several stages.

* * * * *